United States Patent [19]

Hammersmith

[11] 3,881,563

[45] May 6, 1975

[54] GRADER BLADE ATTACHMENT FOR TRACTORS

[76] Inventor: Albert A. Hammersmith, c/o Al Hammersmith & Son Mfg. Co., 5th & Central Ave., Horton, Kans.

[22] Filed: July 31, 1972

[21] Appl. No.: 276,706

[52] U.S. Cl. ................................. 180/14; 180/12
[51] Int. Cl. ............................................. B60d 7/00
[58] Field of Search ............... 180/11, 12, 13, 14 R; 37/108 R, 109, 42 R; 172/780, 801, 802, 803, 491, 781; 280/402

[56] References Cited
UNITED STATES PATENTS

| | | | |
|---|---|---|---|
| 2,727,581 | 12/1955 | Wright | 180/14 R |
| 2,735,253 | 2/1956 | Huddle | 180/14 R |
| 3,061,029 | 10/1962 | Pryor | 180/12 |
| 3,101,854 | 8/1963 | Kampert | 280/402 X |
| 3,119,630 | 1/1964 | Oliver | 180/12 |
| 3,127,193 | 3/1964 | Johnson et al. | 180/12 |
| 3,150,884 | 9/1964 | Drott | 37/42 R |
| 3,478,833 | 11/1969 | Bacon et al. | 180/12 |
| 3,524,514 | 8/1970 | Kratzke | 280/402 |
| 3,565,181 | 2/1971 | Bahm et al. | 172/491 |

FOREIGN PATENTS OR APPLICATIONS

| | | | |
|---|---|---|---|
| 864,264 | 1/1953 | Germany | 172/781 |

Primary Examiner—Albert J. Makay
Attorney, Agent, or Firm—Schmidt, Johnson, Hovey & Williams

[57] ABSTRACT

In an attachment for a tractor, a tool-supporting frame, having an adjustable grader blade, extends forwardly from the tractor and is releasably secured thereto. The frame is provided with a steerable front wheel and axle unit operably coupled with the steerable front wheel and axle structure of the tractor, such structure being raised and maintained off the ground by the frame of the attachment when the latter is secured to the tractor. That portion of the weight of the tractor which is normally supported by the front wheel and axle structure of the tractor is, therefore, transferred to the front wheel and axle unit of the frame, such unit being well ahead of the blade so that a substantial portion of the combined weight of the tractor and the frame is utilized to keep the blade in contact with the ground. The steerable unit of the frame is responsive to the activation of the steering mechanism of the tractor for rendering the turning movements of the tractor and frame assembly responsive solely to the operation of the steerable unit of the frame.

10 Claims, 14 Drawing Figures

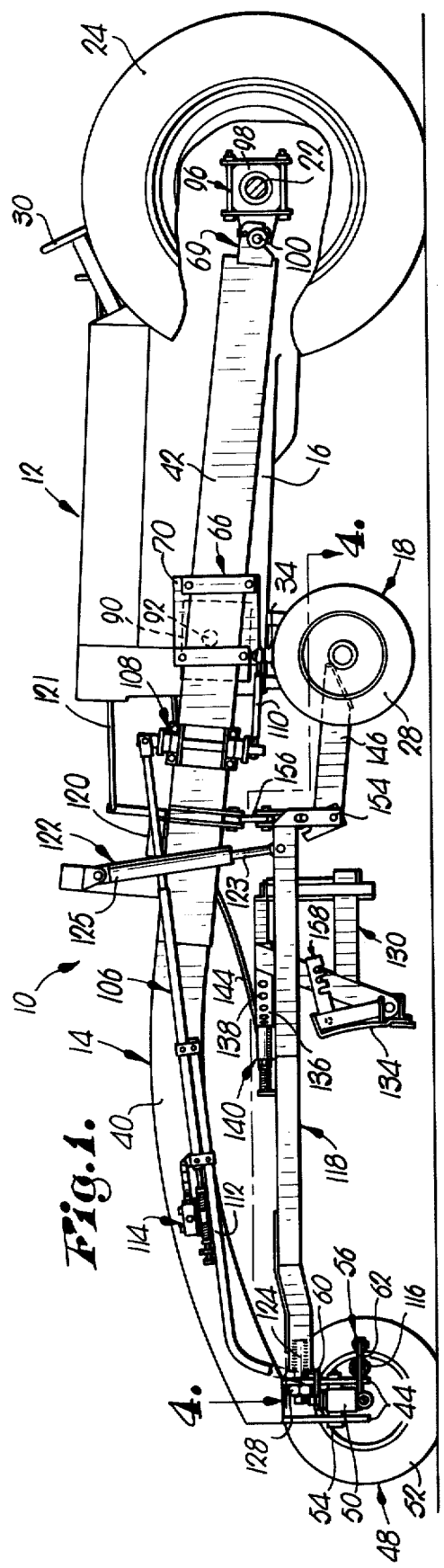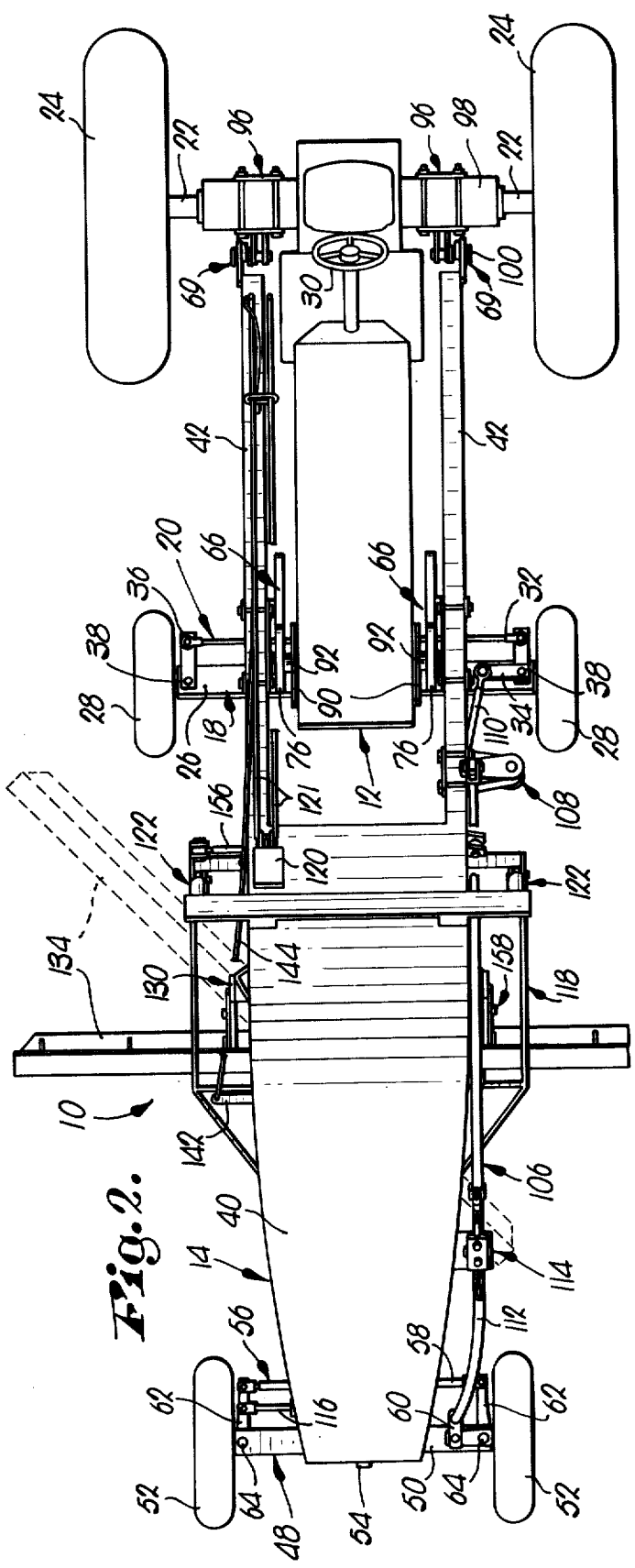

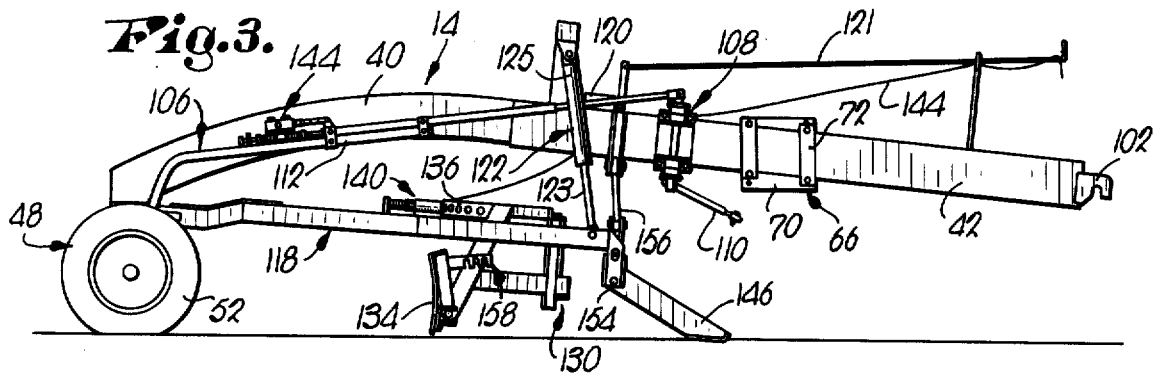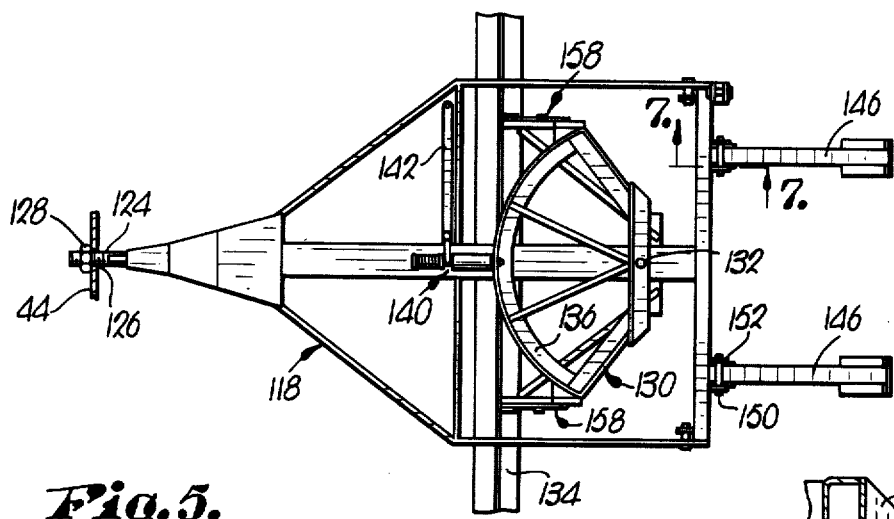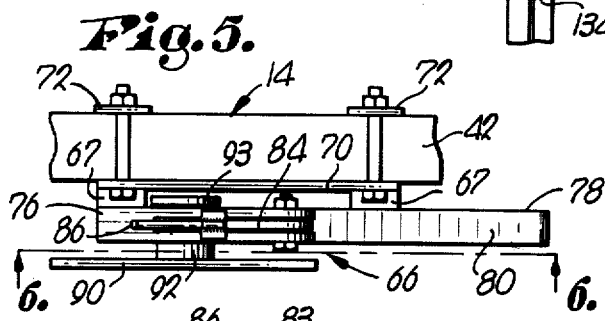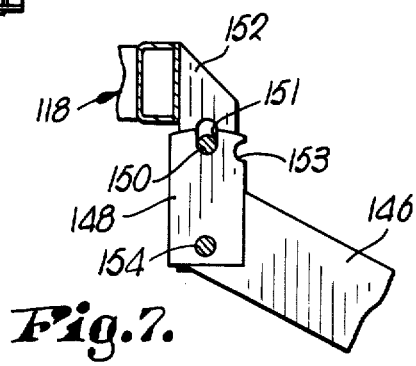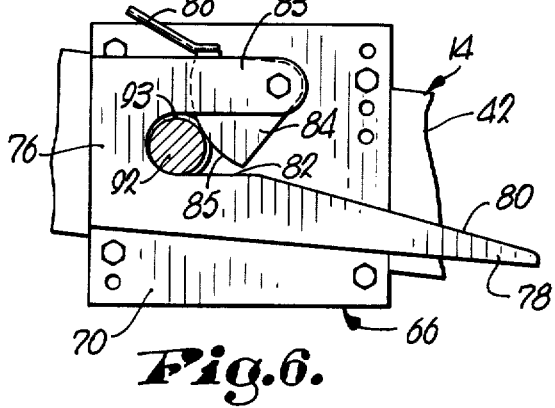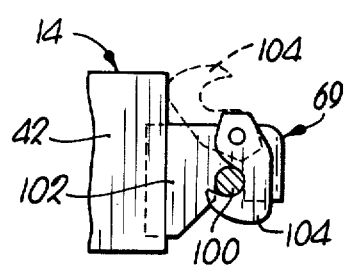

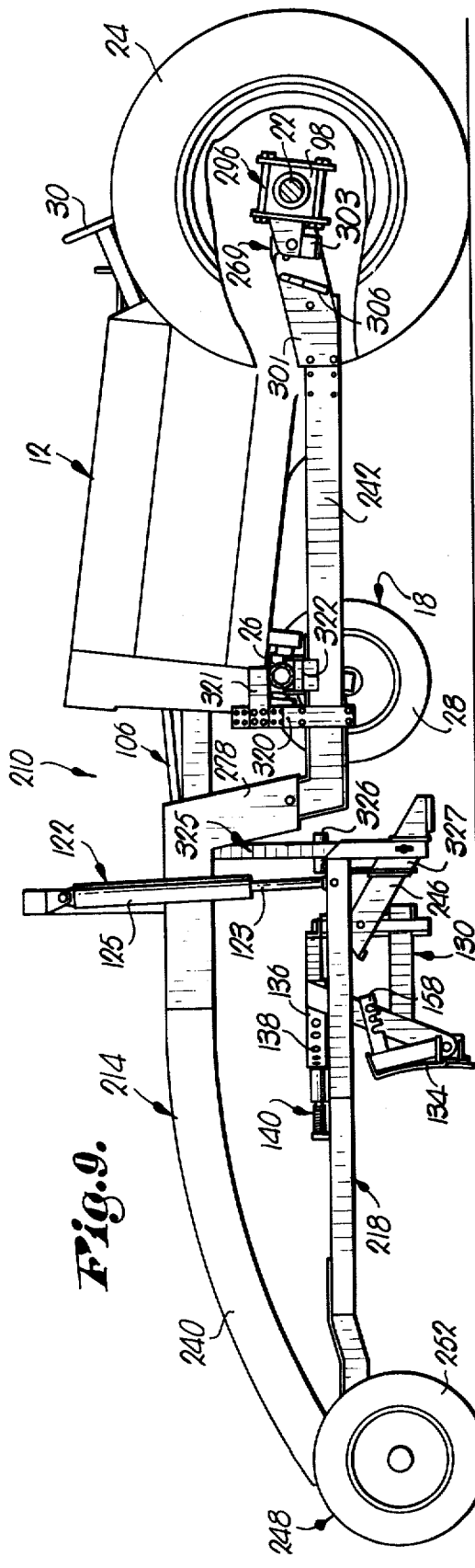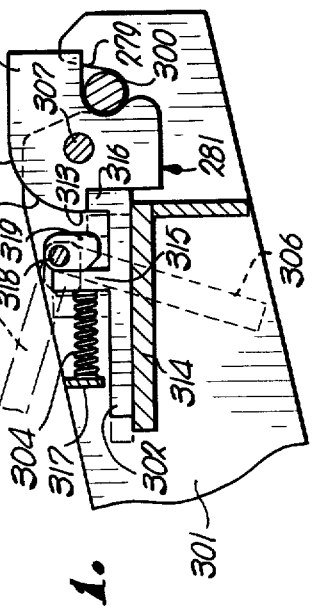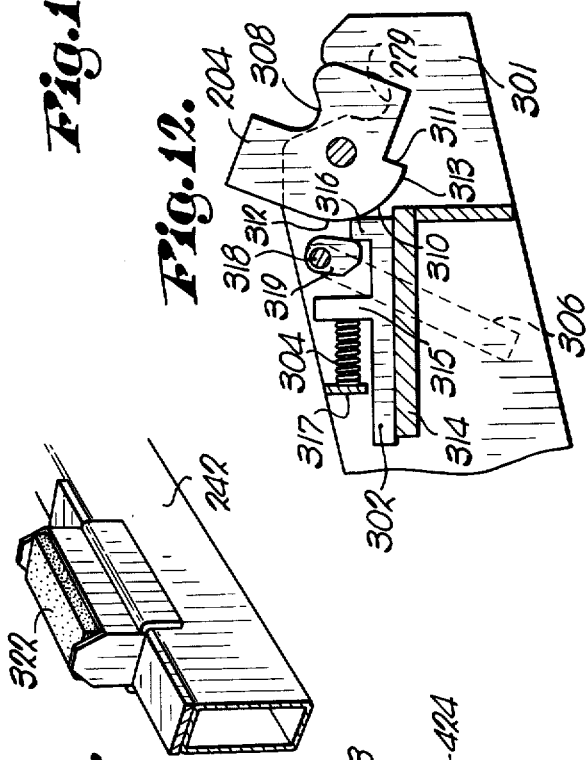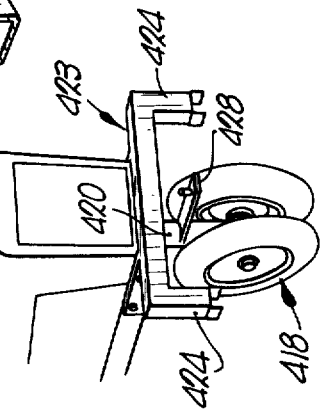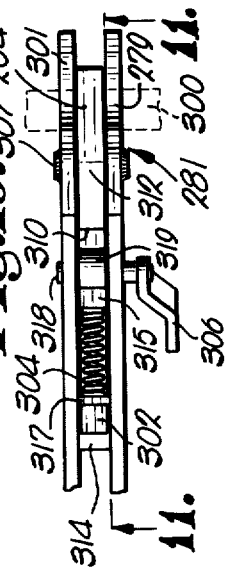

GRADER BLADE ATTACHMENT FOR TRACTORS

This invention relates to a mobile assembly comprising a tractor and a forwardly extending tool-supporting frame adaptable to support a tool such as a grader blade used for land leveling, road maintenance, and ditching.

There are many instances wherein there is need for a tool as above mentioned, but the need is not great enough to warrant investment in a relatively expensive motor grader that is built and designed primarily for use as a grader and has limited capability for other uses. An alternative for the occasional user has been to utilize a standard farm or industrial tractor that is provided with a blade carried either forwardly or rearwardly of the tractor by a conventional lift mechanism. While this arrangement is tolerable in certain instances, the true benefits of a motor grader cannot be realized because of the improper weight distribution of the tractor with respect to the blade, as well as the less than ideal, relative location of the blade to the ground-engaging wheels of the tractor. It is most desirable to have the grader blade between the front and rear wheels of the vehicle rather than ahead of or behind the wheels, as would be the case when a standard tractor lift mechanism is used, in order to achieve the best leveling and grading capabilities.

The most efficient and satisfactory job of grading can be obtained if the frame from which the blade is suspended extends forwardly of the latter and is provided with ground-engaging wheels located well ahead of the blade. Attachment of a frame that embodies this feature to a tractor creates serious problems in that the steering of the tractor must then be coordinated with the frame wheels so that the two sets of wheels properly track without imposing undue structural strain on either of them, and the scuffing action of the wheels relative to the ground when the assembly is in a turning movement must be minimized.

An important object of the present invention is to provide a mobile assembly capable of utilizing a readily available tractor as a power source, but which overcomes the above-mentioned problems which heretofore have been inherent in attachments of this nature.

Another important object of the present invention is the provision of a grader blade attachment having all of the essential and desirable characteristics of a vehicle constructed primarily for use as a motor grader, appealing, therefore, particularly to those users who have an occasional need for such an implement yet do not feel that their needs justify the high expense of a self-contained motor grader.

Still another important object of my invention is to provide a steerable, tool-supporting frame attachment extending forwardly of a tractor and maintaining the front wheels thereof off the ground, and which can be readily and easily secured thereto and removed, thereby rendering the tractor available for other uses when the frame and its tool are not needed.

A further important object is to provide an attachment having means for automatically raising the front wheels off the ground as the attachment and the tractor are interconnected and automatically lowering such wheels back to the ground when the attachment is released from the tractor and the latter is backed away.

It is another important object of my invention to provide a forwardly extending, tool-supporting frame attachment for a tractor in which the tractor weight that is normally carried by the front wheels of the tractor is transferred to the frame and its ground-engaging wheels.

It is yet another important object of the present invention to provide an attachment for a tractor in which the turning movement of the entire assembly is responsive solely to the operation of the ground-engaging wheels of the attachment.

Still another very important object of my invention is to provide a forwardly extending frame attachment for a tractor in which the frame supports a tool mount that may be swung vertically about a transverse horizontal axis and rotatable about a generally fore-and-aft axis in order to orient a tool in any number of transversely angular positions.

Another important object of my invention is to provide a hitch having a latch that automatically shifts from an open to a closed position thus eliminating the need for any manual assistance in engaging the hitch at the time the frame is secured to the vehicle. In conjunction with the above stated object it is a further aim that the latch likewise automatically shift from a closed to an open position when the frame is removed from the vehicle and remain in such open position until the frame is again secured to the vehicle.

In the drawings:

FIG. 1 is a side elevational view of a grader blade attachment for tractors made pursuant to my invention shown mounted on a tractor, parts thereof broken away or removed for clarity;

FIG. 2 is a plan view thereof;

FIG. 3 is a side elevational view on a reduced scale of the attachment removed from the tractor;

FIG. 4 is a fragmentary view of the attachment taken along irregular line 4—4 of FIG. 1;

FIG. 5 is an enlarged, fragmentary, detailed plan view of the attachment frame and of one of the front releasable connections between the attachment frame and the tractor chassis;

FIG. 6 is a cross-sectional view taken along line 6—6 of FIG. 5;

FIG. 7 is an enlarged, fragmentary, detailed, cross-sectional view taken along line 7—7 of FIG. 4;

FIG. 8 is an enlarged, fragmentary, detailed view of one of the rear connections for securing the frame to the chassis;

FIG. 9 is a side elevational view similar to FIG. 1, parts being broken away or removed for clarity to illustrate a modified form of the frame and releasable connections for securing the frame to the chassis;

FIG. 10 is an enlarged, fragmentary, detailed plan view showing one of the rear connection hitches of the modified form;

FIG. 11 is an enlarged, fragmentary, detailed cross-sectional view taken along line 11—11 of FIG. 10;

FIG. 12 is an enlarged, fragmentary, detailed view similar to FIG. 11 showing a latch of the hitch in its open, pin-receiving position;

FIG. 13 is an enlarged, fragmentary, detailed perspective view of one of the front connections of the modified form; and FIG. 14 is a perspective view of an alternate front connection bracket for use with the modified frame when the latter is to be secured to a vehicle having a tricycle-type front wheel and axle structure.

Referring initially to the embodiment of my invention illustrated in FIGS. 1-8, a mobile assembly, broadly designated by the numeral 10, is provided with a power vehicle 12, such as a tractor, to which an elongated, forwardly extending, tool-supporting frame 14 is releasably secured. Vehicle 12 includes an elongated, fore-and-aft chassis 16 provided with a front wheel and axle structure 18 having a steering mechanism 20 and a pair of rear drive axles 22 and drive wheels 24. Structure 18 includes a transverse axle 26 having steerable, ground-engaging wheels 28. An operator-actuated steering wheel 30 is linked to the mechanism 20 by a rod 32 interconnecting cranks 34 and 36 that are rigidly attached to kingpin 38 at each end of axle 26 respectively.

The frame 14 includes a body 40, longitudinally arched upwardly and provided with a pair of spaced, rearwardly extending arms 42. A pair of spaced plates 44 depending from the body 40 at its forward end receives a bar 50 there-between that is swingable vertically about a fore-and-aft pin 54 which interconnects the plates 44. The bar 50 forms a part of a front wheel and axle unit 48 and supports a pair of wheels 52. A conventional steering apparatus 56 for the wheels 52 includes upright kingpins 64 and a link 60 is secured rigidly to one of such kingpins 64. Cranks 62 rigid to kingpins 64 are pivotally interconnected by a tie rod 58.

Each arm 42 has a mounting assembly 66 adjacent the body 40 and each assembly 66 includes a plate 70 adjustably mounted on the corresponding arm 42 by a pair of clamps 72. Each plate 70 has a J-shaped bracket 76 rigidly secured to its inner face and held away from the latter by spacers 67. The longer, rearwardly extending leg 78 of the bracket 76 has a downwardly and rearwardly sloping, upwardly facing cam surface 80 which terminates at its upper end in a rearwardly facing socket 82 below a bifurcated leg 83 of the bracket 76. A vertically swingable latch 84, carried by the leg 83, having an arcuate edge 85 is normally held in closing relationship to the mouth of the socket 82 by gravity and may be released through use of a handle 86 on the latch 84.

Each assembly 66 includes also a plate 90 secured to the chassis 16 in any suitable manner, preferably above the structure 18, having an outwardly extending projection 92 adapted to fit within the socket 82 and provided with a flange 93 at its outer end.

The rearmost end of each arm 42 has a releasable connection 69 to a housing 98 for the axles 22, the connection 69 including a clamp 96, provided with a pin 100, on the housing 98. Each arm 42 has a hook 102 which receives the pin 100 and a swingable latch 104 adapted to loop beneath the pin 100 as best seen in FIG. 8.

A mechanical coupling 106 releasably interconnects the mechanism 20 and the apparatus 56. The coupling 106 includes a jackshaft and bearing assembly 108 carried on one of the arms 42 and is adjustable longitudinally therealong, an adjustable link 110 extending rearwardly from the assembly 108 and which is adapted to be pivotally attached to the crank 34, and an adjustable linkage 112 extending forwardly from the assembly 108 and is attached at its foremost end to the link 60. The linkage 112 may include a power steering assist valve assembly 114, mounted on the frame 14 and plumbed into a hydraulic system (not shown) of the vehicle 12 which is responsive to fore-and-aft movement of the coupling 106 to activate a hydraulic cylinder 116 interposed between one of the plates 46 of the frame 14 and one of the cranks 62 of the steering apparatus 56.

A vertically adjustable, transversely rotatable tool mount 118, disposed between the unit 48 of the frame 14 and the structure 18 of the vehicle 12, is shiftable relative to the frame 14 and is suspended therefrom by a forwardly protruding threaded shaft 124 which passes through an oversize opening 126 in the rearmost plate 46 and by a pair of spaced-apart hydraulic cylinder assemblies 122 located generally midway between the fore-and-aft ends of the frame 14, each assembly 122 having a piston 123 and a cylinder 125. The shaft 124 is maintained in engagement with the plate 46 by a threaded nut 128 and the assemblies 122 are controlled by a hydraulic valve 120 having a pair of rearwardly extending control rods 121.

A shiftable subframe 130, carried by the mount 118 and swingable about a vertical axis 132, is provided with a transverse, elongated scraper blade 134 and may be held in any number of transverse, angular positions by a quadrant 136 having a series of apertures 138 which are in a position to receive a spring-loaded keeper pin assembly 140 carried by the mount 118. The pin assembly 140 may be disengaged from quadrant 136 through use of a lever 142 and a rope pull 144 when the subframe 130 is to be repositioned.

A pair of vertically swingable standards 146, extending downwardly and rearwardly from the mount 118, each include a notched arm 148 that engages a pin 150 held by a pair of brackets 152 and swings about a pin 154, also held by the brackets 152. A transverse stabilizer arm 156 interconnecting the frame 14 and the trailing end of the mount limits the lateral movement of the mount 118 relative to the frame 14.

In operation, the vehicle 12 is advanced forwardly such that the forward end of its chassis 16 passes between the arms 42 of the frame 14 and moves toward the unit 48. The projections 92 engage the inclined surfaces 80 of the legs 78 and as the vehicle 12 continues to move forward, the inclined, upward movement imparted to the projections 92 by the legs 78 causes the forward end of vehicle 12 to raise so that the structure 18, with its wheels 28, is off the ground by the time the projections 92 are advanced into the sockets 82. As the projections 92 approach the sockets 82 they engage the latches 84 and cause them to swing upwardly and away from the socket 82. However, once the projections 92 have reached the closed ends of the sockets 82 they will have cleared the arcuate edges 85 of the latches 84 which then are free to swing back to their original positions closing the mouths of the sockets 82, thus holding the projections 92 in their respective sockets 82. The structure 18 has now been rendered ineffective to influence the direction of the assembly 10 because of the wheels 28 being removed from contact with the ground. Once the projections 92 have been positioned in sockets 82, the rearwardmost brackets 102 are located directly above the pins 100.

The valve 120 is now connected to the hydraulic system of the vehicle 12 so that the assemblies 122 may be utilized to complete the securing of the frame 14 to the chassis 16. Once the assemblies 122 have been made operable, the rods 123 are partially retracted into the cylinders 125 causing the trailing ends of the arms 42 to lower by virtue of the pivoting action of the frame 14 about the wheels 28 as the weight of the tractor 12 bears down on the arms 42, thus bringing the brackets 102 into engagement with the pins 100, at which time the latches 104 are manually swung into a pinlocking position as shown in FIG. 8. The assemblies 66, along with the rear connections 94, now maintain the frame 14 rigid relative to the chassis 16 and effectively eliminates the capability of the assemblies 122 to shift the frame 14 with respect to the chassis 16. Further activation of the cylinders 122 now causes the tool mount 118 to move vertically relative to the frame 14. After the connections 69 have been secured, the rods 123 are further retracted to raise the mount 118 and thus permit relocation of the standards 146 to an out-of-the-way position by removing the pins 150, swinging the standards 146 to a generally horizontal position as seen in FIG. 1, and reinserting the pins 150 into slotted holes 151 so that the half-moon notches 153 in the arms 148 engage the pins 150, thereby preventing the standards 146 from swinging downwardly about the pins 154.

The link 110 of the coupling 106 is connected to the crank 34 for rendering the apparatus 56 responsive to the actuation of the mechanism 20, thus making the turning movements of the assembly 10 dependent on the shifting of the apparatus 56. The fore-and-aft movement of the linkage 112 activates the power assist valve 114, which also has been made operable by a connection with the tractor hydraulic system to control the movement of the cylinder 116 for shifting the apparatus 56 relative to the bar 50.

The grader blade 134 may be shifted to any one of a number of positions, both with respect to the mount 118 through the use of the quadrant 136 and the pin assembly 140 as well as with respect to the frame 14 through the use of the assemblies 122 and the shaft 124. Use of the assemblies 122 to raise and lower the mount 118 causes the latter to swing vertically about a transverse horizontal axis at the point where the plate 46 and the shaft 124 are in engagement. It is also possible to rotate the mount 118 about a generally horizontal fore-and-aft axis by extending one of the assemblies 122 while retracting the other assembly 122 which causes the shaft 124 to rotate laterally relative to the plate 46. The transverse angularity of the blade 134 is determined by the relative relationship of the quadrant 136 with respect to the pin assembly 140 as it engages one of the apertures 138. The blade 134 is selectively tiltable fore-and-aft relative to the subframe 130 and is held in any one of several positions by a pair of notched arm and pin assemblies 158.

The manner in which the mount 118 is suspended from the frame 14 enables the operator to locate the blade 134 in a great number of positions ranging from simple vertical adjustments to the various angular attitudes common to tools of this kind. The shaft 124 placed along the fore-and-aft longitudinal axis of the mount 118 along with the laterally spaced-apart assemblies 122 permits the mount 118 to be oriented vertically while at the same time also being disposed angularly transverse of the frame 14. It is to be noted that this highly desirable adjustability of the tool mount 118 is accomplished through the incorporation of the readily available hydraulic system of the vehicle coupled with the pair of standard hydraulic assemblies 122 and the utilization of the simple pivot of the shaft 124 at the plate 46 instead of relying on complex auxiliary mechanism and controls.

The raising of the structure 18 off the ground by assemblies 66 accomplishes two very significant requirements that are needed to effectively use a tool such as a grader blade. The weight of the vehicle normally carried by the structure 18 has now been transferred to the frame 14 and its unit 48 which is very desirable and beneficial for the proper functioning of the blade 134 when in its ground-engaging position. Hard ground is quite often encountered when grading, and if sufficient weight and force are not exerted downwardly on the blade, it tends to become ineffective by riding up and skimming over the ground rather than to penetrate and perform its scraping or digging operation. The advantage of this weight distribution may be further illustrated by calling attention to the fact that when a scraper blade is directly attached either forwardly or rearwardly to the tractor, as previously referred to, the weight of the tractor or a portion thereof cannot be utilized and be brought to bear upon the blade, thus decreasing its functional capability.

Raising of the structure 18 off the ground further enhances the practicality of the present invention as an attachment for a tractor in that the problem of coordinating the tracking of two steerable elements, which in this case would be the structure 18 and the unit 48, is eliminated. The assembly 10 has been made solely responsive to the operation of the apparatus 56 and in no way depends on contact of the structure 18 with the ground. The only function provided by the structure 18 at this time is that its steering mechanism 20, which is activated by an operator turning the steering wheel 30, is utilized to transmit such turning action to the steering apparatus 56 through the coupling 106.

The relative ease and simplicity with which the assemblies 66 and the connections 69 enable the frame 14 to be quickly secured to the chassis 16 without the need for auxiliary jacks or other hoisting means is very important when an attachment of this type is provided for a vehicle. The fact that the user simply drives the vehicle 12 into engagement with frame 14 so that the projections 92 are located in the sockets 82 and then utilizes the hydraulic system of the tractor to further bring the frame 14 into proper engagement with the vehicle 12 effectively eliminates any objection regarding hook-up time as is so often the case with attachments that significantly change the performance capabilities of a vehicle. Once the need for the attachment has been eliminated it may be just as easily and quickly removed from the vehicle 12 by moving the latches 84 and 104 to an out-of-the-way position with respect to their corresponding projections 92 and pins 100 and merely reversing the foregoing procedure used to secure the frame 14 to the vehicle 12. Thus, when the vehicle 12 is backed away from the frame 14, the cam surfaces 80 lower the front end of the tractor so that the wheels 28 are again in contact with the ground. The vehicle 12 is now free to be employed in any other capacity for which it may be needed.

Referring to FIGS. 9-13, there is shown a modification in which a mobile assembly 210 is provided with a tool-supporting frame 214 releasably secured to the vehicle 12, it being understood that the vehicle 12 is the same as that initially described and shown in FIG. 1. The frame 214 is provided with a front wheel and axle unit 248 and wheels 252 (only one of which is shown) which are interconnected with the wheel and axle structure 18 of the vehicle 12 in much the same manner as shown in the earlier described embodiment.

The frame 214 includes a body 240 provided with a pair of spaced-apart, elongated arms 242 (only one being shown) adjustably attached at the lower end of respective downwardly depending legs 278 of the body 240. The arms 242 extend rearwardly from the body 240 and on each side of the vehicle chassis 16 similar to the arms 42 of the body 40.

The rearmost end of each arm 242 has a releasable connection 269 which includes a coupling pin 300 carried by a respective clamp 296 releasably attached to the housing 98 of the vehicle 12 and having a pair of arm guide plates 303 (only one of which is shown). The connections 269 each further include a pin-receiving notch 279 and a hitch assembly 281 adjustably and releasably affixed to their respective arms 242.

It is to be understood that the hitches 281 are identical to each other and, therefore, only one will be described. The hitch 281 is comprised of a latch 204 swingably mounted on a frame piece 301 adjustable longitudinally on the arm 242, an elongated lock 302 shiftable on the frame piece 301, a compression spring 304, and a rotatable lever 306. The latch 204 swings about a transversely disposed pin 307 and includes a first cam means 308 engageable by the pin 300, and a second cam means 310 engageable by the lock 302. A catch 311 and the cam 308 are disposed on opposite sides of the pivoting axis of the latch 204. The surface of the cam 310 is a greater distance from the pin 307, which is the axis of rotation of the latch 204, in that general area identified by the numeral 312 than that area identified by the numeral 313.

The lock 302 is longitudinally slidable along a support member 314 and is provided with a pair of longitudinally spaced-apart, upright projections 315 and 316 respectively. The spring 304 is positioned longitudinally parallel to the lock 302 and is in compression between a lug 317, permanently affixed to the frame piece 301, and the projection 315 of the lock 302. The lever 306, swingable about a transversely located pin 318 also affixed to the frame piece 301, has an arm 319 disposed within the frame piece 301 to engage the projection 315 opposite the engagement therewith of the spring 304 when the lever 306 is swung forwardly.

Each arm 242 is provided with an upright standard 320 adjustable longitudinally therealong, having a rearwardly projecting, vertically adjustable element 321 which overlies, in spaced relationship, a respective saddle block 322 that is also slidable longitudinally along the arm 242. A bracket 423, such as seen in FIG. 14, is provided for those vehicles which do not have the wide front axle structure 18 as shown in FIG. 9.

A tool mount 218 is suspended from the frame 214 in the same manner as that described with respect to FIGS. 1-8 and also functions in the same manner. A guide structure 325 having a vertical slot (not shown) cooperates with a pin 326 affixed to the mount 218 to limit the lateral movement of the mount 218 as it is raised and lowered. The structure 325 and the pin 326 perform the same function as the stabilizer arm 156 shown in FIG. 1. The structure of the mount 218 further differs from that of the mount 118 in that a pair of standards 246 (only one shown) are each slidably carried by respective sleeves 327 to be shifted along an inclined plane to an out-of-the-way position rather than swung upwardly and rearwardly as shown in the earlier described embodiment.

The operation of the modification just described is similar to that of the first embodiment in that the vehicle 12 is advanced forwardly toward the unit 248 except that in this instance, the arms 242 pass beneath the axle 26 of the structure 18 until the upwardly facing notches 279 are disposed generally beneath their respective pins 300. The block assemblies 322 are then properly positioned beneath the axle 26 and the hydraulic system of the vehicle 12 is operably connected to the cylinder assemblies 122 as previously described. The activation of the cylinder assemblies 122 to lengthen the effective length of the cylinders 124 causes the arms 242 to raise, and in so doing, causes the blocks 322 to engage the underside of the axle 26 so that continued raising of the arms 242 causes the wheels 28 to be raised off the ground.

The arms 242 are raised until such time as the cam surfaces 308 engage the pins 300, such engagement causing the latches 204 to swing downwardly about the pins 307 and clamp the same to their respective frame pieces 301. As the latches swing into this closed position the action of the springs 304 causes the locks 302 to slide rearwardly until the projections 316 engage the catches 311, thus locking the latches in their closed positions. The frame 214 has now been connected to the vehicle 12 such that the entire assembly 210 is operable in the same manner as that described in conjunction with the first embodiment, it being understood that the unit 248 has been coupled to the structure 18 in the same manner. The downward pressure of the forward part of the vehicle 12 on the arms 42 maintains the axle 26 in engagement with the blocks 322 to render the vehicle 12 and the frame 214 normally rigid relative to one another. After the aforementioned connections have been made, the elements 321 are located over the axle 26 as a safety measure in the event that unusual conditions would cause the axle 26 to raise from the blocks 322 an excessive distance. The standards 246 are now raised and retained in an out-of-the-way location as shown in FIG. 9.

When the frame 214 is to be removed from the vehicle 12 the standards 246 are again lowered and the levers 306 are swung upwardly so that the arms 319 engage their respective projections 315 and slide the locks 302 forwardly against the action of the springs 304, to a position shown by dotted lines in FIG. 11, thus clearing the projections 316 from the catches 311. The operator now activates the cylinder assemblies 122 to cause the arms 242 to lower, at which time the pins 300 cause the latches to swing upwardly into an open position. As the latches swing upwardly, the second cams 310 engage their respective projections 316. Because of the increased distance from the pin 307 of the surface at 312 over that of the surface at 313, the latches 204 move their respective locks 302 further forward than that movement caused by the arms 319 of the levers 306. This added shifting of the locks 302 removes the same from engagement with their arms 319, thus permitting the levers 306 to swing downwardly by virtue of their own weight to a position as seen by dotted lines in FIG. 11. It is to be understood, of course, that the safety stops 321 have been removed prior to the lowering of the arms 242. After the hydraulic system of the vehicle 12 has been uncoupled from the assemblies 122, the vehicle may be backed away from the frame 214. The action of the springs 304 biasing the locks 302 toward the latches 204 maintains the latter in their open positions until such time as the vehicle is again attached to the frame 214.

From the foregoing it will be appreciated that the hitches 281 provide a way of automatically moving the latches 204 from open to closed positions or vice versa as the arms are raised and lowered with respect to the vehicle 12. Other than for the manual shifting of the lever 306 at the time the unhitching process is begun, the entire connection is made without the need for having some one lock the latches in a closed position as the arms are raised, thus making it possible for the operator to secure the frame 214 to the vehicle 12 unassisted.

The securing of the frame 214 to a vehicle 412 having a narrow front wheel and axle structure 418 as illustrated in FIG. 14, is the same as that shown in FIG. 9 except that the arms 242 engage the bracket 423, which has a pair of downwardly facing yokes 424 for receiving respective arms 242, rather than the axle 26. It is to be further noted that a steering mechanism 420 of the structure 418 is provided with an arm 428 to which the link 110 of the coupling 106 is attached for rendering the unit 248 of the frame 214 responsive to the actuation of the mechanism 420.

The present invention makes it possible for a user who has only an occasional need for a tool, such as herein disclosed, to convert a tractor that he may already have, rather than to require an investment in a high price vehicle which has been designed for use exclusively as a grader and as a result has very limited potential for other uses. The distinct advantage of utilizing a tractor is that this source of power may be made available for other uses when the grader blade attachment is not needed. Such is not the case with a motor grader where the power source is integral with the frame and blade and is inseparable therefrom. Along with this adaptability, the highly desirable features of proper weight distribution, excellent steering characteristics and ideal positioning of the blade with relation to the frame and ground-engaging wheels of conventional graders have been incorporated in the attachment. It is not at all uncommon for attachments to be inefficient and to only partially perform their intended function because compromises very often have to be made in order to attach them to a vehicle not primarily designed for the use to which it is being adapted. The present invention very effectively overcomes this serious problem.

Having thus described the invention what is claimed as new and desired to be secured by Letters Patent is:

1. In a mobile assembly:
   a single, powered vehicle defining a prime mover having a chassis provided with rear drive wheels and a front wheel and axle structure having a steering mechanism;
   an elongated, tool-supporting frame extending forwardly of said axle structure and provided with a front wheel and axle unit having a steering apparatus, said tool-supporting frame being adapted to carry a tool between said axle unit and said drive wheels;
   releasable means securing the tool-supporting frame to the chassis in a substantially rigid manner to prevent relative movement between the frame and the vehicle; and
   a coupling including a linkage assembly between said steering mechanism and said steering apparatus for rendering the latter responsive to actuation of said steering mechanism,
   said tool-supporting frame and said axle unit maintaining said axle structure off the ground for transferring the weight of the front of said vehicle from said axle structure to said axle unit and for rendering the turning movements of the mobile assembly responsive solely to the operation of said steering mechanism.

2. An assembly as claimed in claim 1, wherein is provided a bracket attached to the chassis adjacent said structure, and wherein said frame includes a pair of elongated arms beneath said bracket; and power actuated means carried by said frame and operably coupled with said vehicle for raising said arms into lifting engagement with said bracket during attachment of the frame to the vehicle to thereby raise the wheels of said structure off the ground.

3. In a mobile assembly:
   a powered vehicle having a chassis provided with a front wheel and axle structure having a steering mechanism;
   an elongated, tool-supporting frame extending forwardly of said structure and provided with a front wheel and axle unit having a steering apparatus;
   releasable means securing the frame to the chassis; and
   a coupling between said mechanism and said apparatus for rendering the latter responsive to actuation of said mechanism,
   said frame and said unit maintaining said structure off the ground for transferring the weight of the front of said vehicle from said structure to said unit and for rendering the turning movements of the assembly responsive solely to the operation of said apparatus,
   said releasable means including a pair of members attached to said frame and said chassis respectively, one of said members being provided with a cam, the other of said members being a projection engageable with the cam to raise said structure off the ground during attachment of the frame to the vehicle and as the latter is advanced toward said unit.

4. An assembly as claimed in claim 3, wherein said one member has a socket receiving said projection to maintain said structure off the ground.

5. An assembly as claimed in claim 4, wherein is provided a releasable latch for holding said projection in said socket.

6. An assembly as claimed in claim 4, wherein said releasable means further includes a connection rearwardly of said members, said connection and said members being disposed to maintain said frame rigid relative to said chassis.

7. In a mobile assembly:
   a powered vehicle having a chassis provided with a front wheel and axle structure having a steering mechanism;
   an elongated, tool-supporting frame extending forwardly of said structure and provided with a front wheel and axle unit having a steering apparatus;
   releasable means securing the frame to the chassis;
   a coupling between said mechanism and said apparatus for rendering the latter responsive to actuation of said mechanism, said frame and said unit maintaining said structure off the ground for transferring the weight of the front of said vehicle from said structure to said unit and for rendering the turning movements of the assembly responsive solely to the operation of said apparatus, said frame including a pair of elongated arms beneath the axle of said structure; and means for raising said arms into lifting engagement with the axle of said structure during attachment of the frame to the vehicle to thereby raise the wheels of said structure off the ground.

8. An assembly as claimed in claim 7, wherein said releasable means includes a connection to the vehicle for each arm respectively disposed rearwardly of the structure.

9. An assembly as claimed in claim 8, wherein said releasable means further includes an element for limiting the extent of movement of the axle of said structure upwardly away from said arms.

10. An assembly as claimed in claim 8, wherein each of said connections includes a coupling pin on the vehicle, a pin-receiving notch in the arm and a hitch for detachably holding the pin in the notch, said hitch comprising:

a latch swingably mounted on said arm adjacent the notch and provided with a catch;

cam means on said latch engageable by said pin for swinging the latch to and from a closed position retaining the pin in said notch; and a lock shiftable on said frame piece to and from a position engaging said catch to releasably hold the latch in said closed position;

said lock and said latch having surfaces in interengagement when the latch is swung to an open position, said surfaces being operable to releasably hold the latch in said open position.

* * * * *